United States Patent
Sirigere et al.

(10) Patent No.: US 12,037,944 B2
(45) Date of Patent: Jul. 16, 2024

(54) ADDITIVE HEAT EXCHANGER AND METHOD OF FORMING

(71) Applicant: Unison Industries, LLC, Jacksonville, FL (US)

(72) Inventors: Gurudatta Srinivasa Murthy Sirigere, Bengaluru (IN); Gordon Tajiri, Waynesville, OH (US); Dattu Guru Venkata Jonnalagadda, Bengaluru (IN); Rajapriyan Rajendran, Bengaluru (IN); Udaya Bhaskar Pamidimarri, Bengaluru (IN)

(73) Assignee: Unison Industries, LLC, Jacksonville, FL (US)

(*) Notice: Subject to any disclaimer, the term of this patent is extended or adjusted under 35 U.S.C. 154(b) by 0 days.

(21) Appl. No.: 18/332,090

(22) Filed: Jun. 9, 2023

(65) Prior Publication Data

US 2023/0313740 A1    Oct. 5, 2023

Related U.S. Application Data

(62) Division of application No. 17/363,155, filed on Jun. 30, 2021, now Pat. No. 11,713,715.

(51) Int. Cl.
*F02C 7/10* (2006.01)
*B23P 15/26* (2006.01)

(52) U.S. Cl.
CPC .............. *F02C 7/10* (2013.01); *B23P 15/26* (2013.01); *F05D 2220/62* (2013.01); *F05D 2240/24* (2013.01); *F05D 2260/2214* (2013.01)

(58) Field of Classification Search
CPC ...... F02C 7/08; F02C 7/10; F02C 7/12; F02C 7/14; F02C 7/141; F02C 7/143; F02C 7/18; F02C 7/185; F02K 3/115; C25D 1/00; C25D 1/02; C25D 1/10; B23P 15/26; F05D 2220/62; F05D 2230/30; F05D 2230/31; F05D 2240/24; F05D 2260/20; F05D 2260/2214
See application file for complete search history.

(56) References Cited

U.S. PATENT DOCUMENTS

| | | |
|---|---|---|
| 2,764,266 A | 9/1956 | Haworth |
| 4,317,646 A | 3/1982 | Steel et al. |
| 4,826,397 A | 5/1989 | Shook et al. |
| 5,581,996 A | 12/1996 | Koch et al. |
| 7,360,989 B2 | 4/2008 | Amiot et al. |
| 7,503,179 B2 | 3/2009 | Estridge et al. |
| 9,341,074 B2 | 5/2016 | Schimmels et al. |
| 9,869,196 B2 | 1/2018 | Day et al. |
| 10,066,497 B2 | 9/2018 | Duguay |
| 10,126,062 B2 | 11/2018 | Cerny et al. |
| 10,458,281 B2 | 10/2019 | Tripodina |
| 10,544,803 B2 | 1/2020 | Cunningham |
| 10,801,350 B2 | 10/2020 | Walston et al. |

(Continued)

*Primary Examiner* — Loren C Edwards
(74) *Attorney, Agent, or Firm* — McGarry Bair PC

(57) ABSTRACT

A method of electroforming a heat exchanger suitable. The method comprising providing a non-sacrificial carrier plate, providing a first sacrificial element and providing a second sacrificial element. The method comprising electroforming a duct over the first sacrificial element and electroforming a rail over the second sacrificial element. The method comprising removing the first sacrificial element and the second sacrificial element.

20 Claims, 9 Drawing Sheets

(56) References Cited

U.S. PATENT DOCUMENTS

| | | |
|---|---|---|
| 2015/0204623 A1 | 7/2015 | Neher et al. |
| 2017/0114667 A1 | 4/2017 | Sabo et al. |
| 2017/0362727 A1 | 12/2017 | Thomas, Jr. |
| 2018/0281048 A1* | 10/2018 | Yang .................. F28F 1/16 |
| 2020/0109480 A1 | 4/2020 | Sridharan et al. |

* cited by examiner

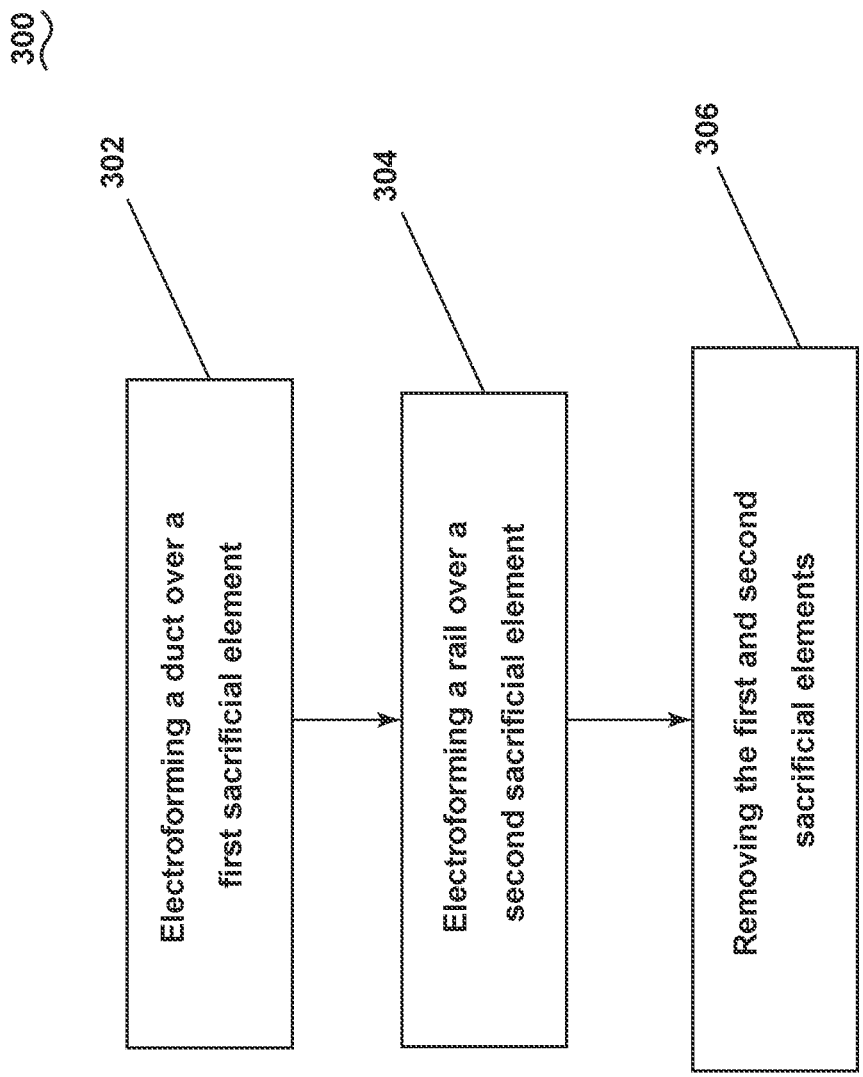

ADDITIVE HEAT EXCHANGER AND METHOD OF FORMING

CROSS REFERENCE TO RELATED APPLICATIONS

This application is a divisional of U.S. patent application Ser. No. 17/363,155, filed Jun. 30, 2021, now U.S. Pat. No. 11,713,715, issued Aug. 1, 2023, which is hereby incorporated by reference in its entirety.

TECHNICAL FIELD

The disclosure generally relates to an additively manufactured heat exchanger, more specifically to an electroformed heat exchanger.

BACKGROUND OF THE INVENTION

Turbine engines, and particularly gas turbine engines, are rotary engines that extract energy from a flow of working air passing serially through a compressor section, where the working air is compressed, a combustor section, where fuel is added to the working air and ignited, and a turbine section, where the combusted working air is expanded and work taken from the working air to drive the compressor section along with other systems, and provide thrust in an aircraft implementation. The compressor and turbine stages comprise axially arranged pairs of rotating blades and stationary vanes. The gas turbine engine can be arranged as an engine core comprising at least a compressor section, a combustor section, and a turbine section in axial flow arrangement and defining at least one rotating element or rotor and at least one stationary component or stator.

In operation, the engine core of gas turbine engines produces substantial amounts of heat. Heat exchangers or heat shields can provide a method to either transfer or shield the heat generated from the engine core such that portions of the gas turbine engine otherwise can be displaced from the heat of the engine core. The heat exchangers, for example, can be arranged in a ring about a portion of a turbine engine so as to shield components radially outward from the ring from the heat of the engine core.

BRIEF DESCRIPTION OF THE INVENTION

In one aspect, the present disclosure relates to an electroformed heat exchanger suitable for use within a turbine engine having an engine centerline, the electroformed heat exchanger comprising, an electroformed carrier plate having a radial outer surface and a radial inner surface, with a stiffener opening extending between the radial inner and outer surfaces, and a plurality of cooling openings extending between the radial inner and outer surfaces, an electroformed duct having an interior fluid conduit fluidly coupled to the plurality of cooling openings, an electroformed rail having at least one interior channel fluidly coupled to the plurality of cooling openings, wherein the interior channel is fluidly coupled to the interior fluid conduit by the plurality of cooling openings, and an electroformed stiffener formed by a portion of the electroformed duct and the electroformed rail and overlying the stiffener opening.

In another aspect, the present disclosure relates to a method of electroforming a heat exchanger suitable for use within a turbine engine having an engine centerline, the method comprising electroforming a duct over a first sacrificial element carried by a non-sacrificial carrier plate, the non-sacrificial carrier plate having a radial outer surface and a radial inner surface, with a stiffener opening extending between the radial inner and outer surfaces, and a plurality of cooling openings extending between the radial inner and outer surfaces, and the first sacrificial element having a stiffener portion overlying the stiffener opening on the radial outer surface and a conduit portion abutting the plurality of cooling openings on the radial outer surface, electroforming a rail over a second sacrificial element having a stiffener portion overlying the stiffener opening on the radial inner surface and a conduit portion abutting the plurality of cooling openings on the radial inner surface, and removing the first and second sacrificial elements to form a conduit within the duct and a channel within the rail, with the conduit and duct connected by the plurality of cooling openings, and further forming a stiffener formed by a portion of the duct and rail and overlying the stiffener opening.

BRIEF DESCRIPTION OF THE DRAWINGS

A full and enabling disclosure of the present description, including the best mode thereof, directed to one of ordinary skill in the art, is set forth in the specification, which refers to the appended FIGS., in which:

FIG. 9 is a method of forming the heat exchanger of FIG. 2.

DETAILED DESCRIPTION OF THE EMBODIMENTS

Figure 1:
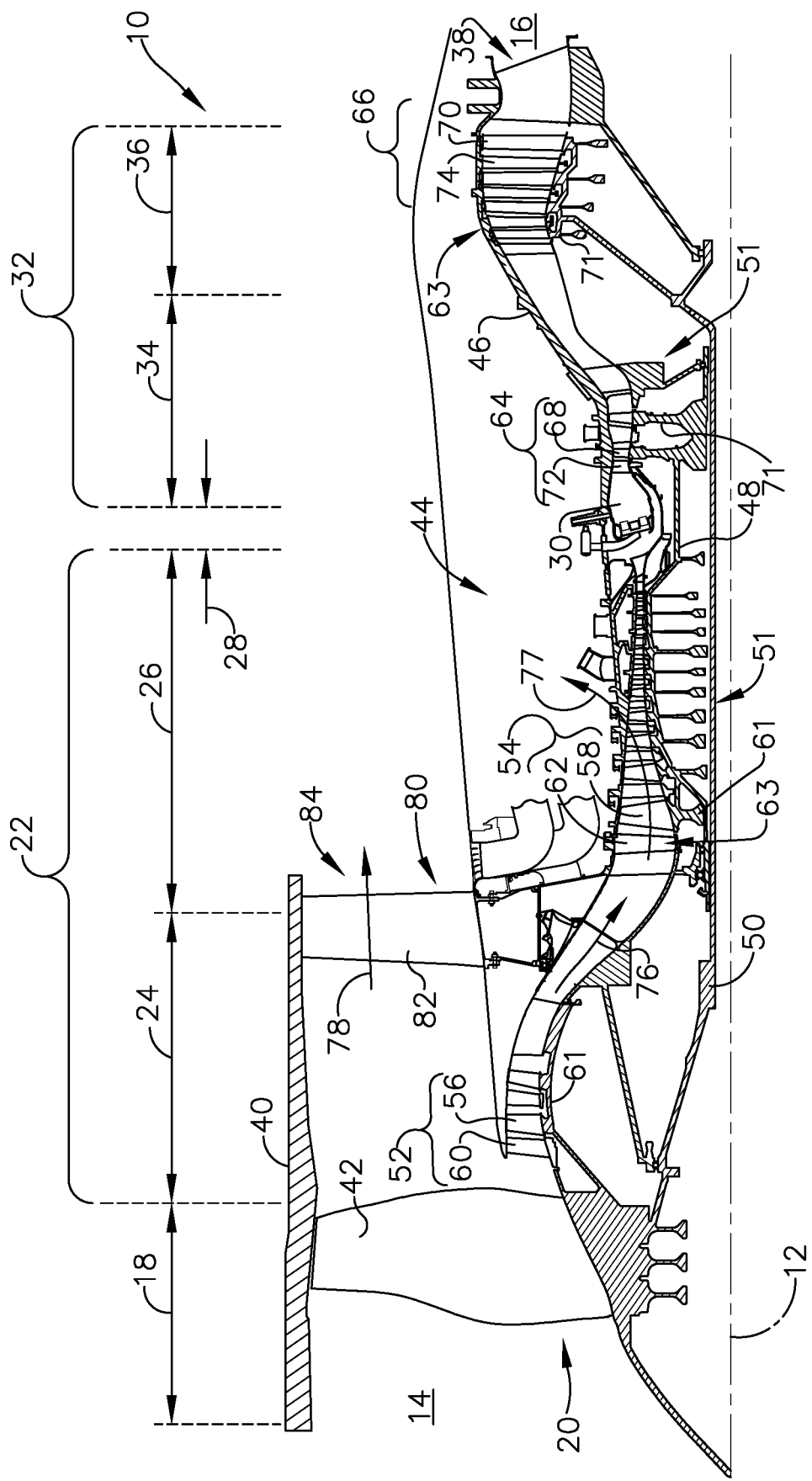
FIG. 1 is a schematic cross-sectional view of a gas turbine engine for an aircraft and including a casing.

The present disclosure relates to a heat exchanger for a turbine engine, specifically a gas turbine engine, and the method of forming the heat exchanger. The heat exchanger can include a conduit or a circuit. Specifically, the conduit can be in the form a set of ducts defining a first interior. A set of rails support the duct relative to a portion of the turbine engine and define a second interior. A carrier plate can be positioned between the duct and rail. The set of ducts, the set of rails and the carrier plate can together be defined as an integral heat shield. It will be appreciated that this disclosure relates to a heat exchanger located on a radially outer portion of an engine casing. The heat exchanger and the engine casing, together, can define an active clearance control (ACC) system. As used herein, an ACC system can refer to a portion of the gas turbine engine which can be used to vary or maintain the clearance or distance between a stationary component or stator, and rotating component or rotor of the gas turbine engine. This minimizes an amount of leakage fluid flowing between the rotor and the stator. As a non-limiting example, the stationary component can be a radially inner portion of the ACC system such as the engine casing, while the rotating component can be a rotating blade within the gas turbine engine.

The method disclosed herein can provide for an additive manufacturing process to form the heat exchanger. Specifically, the heat exchanger can be formed through an electrodeposition manufacturing process such as through electroforming. As such, the present disclosure relates to a method of electroforming a heat exchanger that can be used in an ACC system. For the purposes of illustration, one exemplary environment within which the heat exchanger can be utilized will be described in the form of a turbine engine. Such a turbine engine can be in the form of a gas turbine engine, a turboprop, turboshaft or a turbofan engine having a power gearbox, in non-limiting examples. It will be understood, however, that aspects of the disclosure described herein are not so limited and can have general applicability within other heat exchangers. For example, the disclosure can have applicability for heat exchanger in other engines or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order, and relative sizes reflected in the drawings attached hereto can vary. As used herein, a "set" can include any number of elements, including only one. "Integral monolithic body" or "monolithic body" as used herein means a single body that is a single, non-separable piece, or formed as a single unitary piece at manufacture, as opposed to being formed by combining separate elements into one during manufacture.

FIG. 1 is a schematic cross-sectional diagram of a turbine engine, specifically a gas turbine engine 10 for an aircraft. The gas turbine engine 10 has a generally longitudinally extending axis or engine centerline 12 extending between a forward side 14 to an aft side 16 of the gas turbine engine 10. The gas turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38. The gas turbine engine 10 as described herein is meant as a non-limiting example, and other architectures are possible, such as, but not limited to, the steam turbine engine, the supercritical carbon dioxide turbine engine, or any other suitable turbine engine The fan section 18 includes a fan casing 40 surrounding the fan 20. The fan 20 includes a set of fan blades 42 disposed radially about the engine centerline 12. The HP compressor 26, the combustor 30, and the HP turbine 34 form an engine core 44 of the gas turbine engine 10, which generates combustion gases. The engine core 44 is surrounded by engine casing 46, which can be coupled with the fan casing 40.

A HP shaft or spool 48 disposed coaxially about the engine centerline 12 of the gas turbine engine 10 drivingly connects the HP turbine 34 to the HP compressor 26. A LP shaft or spool 50, which is disposed coaxially about the engine centerline 12 of the gas turbine engine 10 within the larger diameter annular HP spool 48, drivingly connects the LP turbine 36 to the LP compressor 24 and fan 20. The spools 48, 50 are rotatable about the engine centerline 12 and couple to a set of rotatable elements, which can collectively define a rotor 51.

The LP compressor 24 and the HP compressor 26 respectively include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the engine casing 46 in a circumferential arrangement.

The HP turbine 34 and the LP turbine 36 respectively include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the engine casing 46 in a circumferential arrangement.

Complementary to the rotor portion, the stationary portions of the gas turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the gas turbine engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the gas turbine engine 10 via the exhaust section 38. The driving of the LP turbine 36 drives the LP spool 50 to rotate the fan 20 and the LP compressor 24. The pressurized airflow 76 and the combustion gases can together define a working airflow that flows through the fan section 18, compressor section 22, combustor section 28, and turbine section 32 of the gas turbine engine 10.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the gas turbine engine 10 through a stationary vane row, and more particularly an outlet guide vane assembly 80, comprising a set of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the gas turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
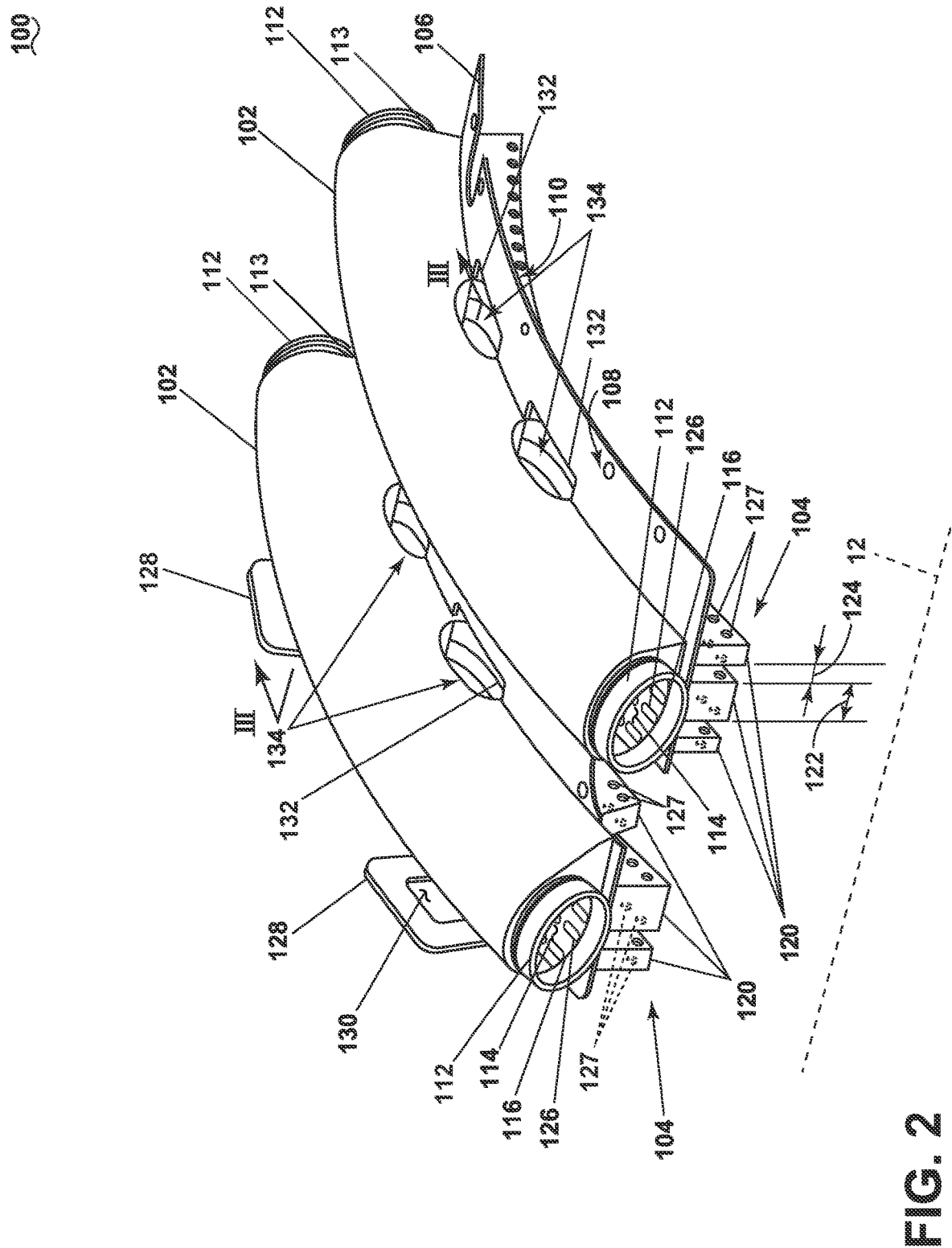
FIG. 2 is a perspective view of a heat exchanger of the gas turbine engine of FIG. 1, and including a set of ducts, a set of rails, a set of stiffeners, and a carrier plate.

FIG. 2 is a perspective view of a heat exchanger 100 located within the gas turbine engine 10 of FIG. 1. As illustrated, the heat exchanger 100 extend circumferentially about the engine centerline 12 and define radius of curvature in the circumferential direction. In other words, the heat exchanger 100 can be curved. It will be appreciated, however, that the heat exchanger 100 can extend across any suitable plane or otherwise not include the curve as illustrated. In other words, the heat exchanger 100 can be non-curved or otherwise extend linearly in any direction. The heat exchanger 100 can be provided within any suitable portion of the gas turbine engine 10 such as, but not limited to, the LP compressor 24, the HP compressor 26, the HP turbine 34, the LP turbine 36, or the fan section 18.

The heat exchanger 100 can include a set of ducts 102, a set of rails 104, and a carrier plate 106 defined by a radial outer surface 108 and a radial inner surface 110 opposite the radial outer surface 108. The carrier plate 106 can be provided between the set of ducts 102 and the set of rails 104. Specifically, the set of ducts 102 can be provided along a portion of the radial outer surface 108, while the set of rails 104 can be provided along a portion of the radial inner surface 110. The set of ducts 102 and the set of rails 104 can each be operatively coupled to the carrier plate 106. As illustrated, the set of ducts 102 can include two axially displaced ducts 102, while the set of rails 104 can include two axially displaced rails 104 axially corresponding to the two ducts 102. It will be appreciated, however, that the heat exchanger 100 can include any number of one or more ducts 102 or any number of one or more rails 104 corresponding to the ducts 102.

The set of ducts 102 can extend in the circumferential direction from one distal end 112, specifically circumferentially distal ends 112, to another. The set of ducts 102 can each include an outer wall defining an interior fluid conduit 114. A set of openings 116 to the interior fluid conduit 114 can be provided at either distal end 112. It is contemplated that the distal end 112 of the ducts 102 can be coupled to a corresponding distal end 112 of an adjacent heat exchanger 100 or to another portion of the gas turbine engine 10 (e.g., a coolant circuit). As such, the one or more heat exchangers 100 can be daisy-chained to one another and the distal ends 112 of the ducts 102 can act as a physical coupling. It will be appreciated that there can be any number of adjacent heat exchangers 100 or segmented heat exchangers 100 extending around at least a portion of a radially outer circumference of the engine core 44. Alternatively, the heat exchanger 100 can be formed as a continuous loop that extends around the entirety of the radial outer circumference. Adjacent heat exchangers 100 can be coupled through any suitable coupling method such as, but not limited to, adhesion, fastening, welding, or any combination thereof. A set of features 113 extending outward from the ducts 102 can be provided circumferentially near at least one of the distal ends 112. The features 113 can, in one non-limiting example, be defined as threads configured to couple the ducts 102 to an additional component (e.g., a coolant circuit) with corresponding threads. Alternatively, the features 113 could be a set of seals configured to fluidly seal the interior fluid conduit 114 from the portions outside of the ducts 102.

The set of rails 104, similar to the set of ducts 102, can extend in the circumferential direction. As a non-limiting example, the set of rails 104 can extend circumferentially between distal ends 112 of the set of ducts 102. A set of circumferential ends, defined as the circumferentially distal portions of the set of rails 104 can be defined by a radially and axially extending plate. In other words, the set of rails 104 can be closed at either circumferentially distal end. Each rail 104 can include a set of fingers 120 displaced from one another and radially extending from the radial inner surface 110 of the carrier plate. As illustrated, each rail 104 can include three fingers 120 of varying sizes. The largest finger 120 of the set of fingers 120 can be defined by a maximum thickness 122 in the axial direction. Further yet, each of the fingers 120 can be axially spaced from one another such that a gap 124 is formed between two adjacent fingers 120. It will be appreciated that the maximum thickness 122, the gap 124, or the number of fingers 120 can vary between rails 104. For example, an exemplary rail 104 can include three fingers 120 of varying sizes, while an adjacent rail 104 can include a single finger 120. A set of outlets 127 can be provided along the exterior of the set of rails 104. The set of outlets 127 can be radially, circumferentially, or axially displaced along the exterior of the set of rails 104 defined by the outer walls of the set of fingers 120. It will be appreciated that there can be any number of one or more outlets 127 provided along the set of rails 104. It will be further appreciated that each finger 120 can include the same number of outlets 127. Alternatively, one finger 120 can have a differing number of outlets 127 in differing axial, circumferential, or radial locations than another finger 120.

The carrier plate 106 can include a set of openings 126 provided along at least a portion of the carrier plate 106 and extending between the radial inner surface 110 and the radial outer surface 108. As illustrated, the set of openings 126 are ovular or elliptical in shape, however, it will be appreciated that they can take any form such as, but not limited, to circular, polygonal, or any combination thereof. The carrier plate 106 can further include an additional opening 132 formed within a portion of the carrier plate 106 and extend between the radial inner surface 110 and the radial outer surface 108. The additional opening 132 can be rectangular in shape and larger than the set of openings 126.

The carrier plate 106 can further include a bracket 128 extending from an axially forward portion of the carrier plate 106 with respect to the set of ducts 102, and the set of rails 104. The bracket 128 can extend in the radial direction from the axially forward portion of the carrier plate and be configured to mount to a portion of the engine casing 46, thus mounting the entire heat exchanger 100 to the engine casing 46. The bracket 128 can be mounted to the engine casing 46 through any suitable coupling method such as, but not limited to, adhesion, welding, fastening, or the like. The bracket 128 can further include a cut out 130 to eliminate unneeded material from the carrier plate 106. As such, the cut out 130 can be defined as a lightening hole or an absence of material. For example, if the portion of the carrier plate 106 defined by the cut out 130 were to be filled with material, the overall weight of the carrier plate 106 would be heavier than if the cut out 130 did not include material. Further yet, the cut out 130 can be used to improve the manufacturability of the carrier plate 106. As a non-limiting example, the carrier plate 106 can be formed as a flat sheet, which is later bent to have the curvature as illustrated. The bracket 128 can further be bent so that it extends perpendicularly from the radially outer surface 108 of the carrier plate 106. The cut out 106 can make it easier to bend the bracket 128 into place when compared to a bracket 128 that includes material instead of the absence of material defined by the cut out 130.

The heat exchanger 100 can further include a stiffener 134, which through at least a portion of the set of ducts 102, or the set of rails 104 in a direction transverse to the engine centerline 12. As a non-limiting example, the stiffener 134 can be formed by a portion of the set of ducts 102 and the set of rails 104 and overlay the additional opening 132. As such, the additional opening 132 can be referred to as a stiffener opening 132. The stiffener 134 can define a void coupled to the stiffener opening 132. The void of the stiffener 134 can extend at least one of axially, circumferentially, or radially with respect to the engine centerline 12. As a non-limiting example, the stiffener 134 can be formed as a unitary structure such that the stiffener 134 can define continuous material that extends between the set of ducts 102, through the stiffener openings 132, and to the set of rails 104. As such, the stiffener 134 can further define a physical coupling between the set of ducts 102 and the set of rails 104. As illustrated, the stiffener 134 can be cylindrical with an ovular or elliptical cross-sectional area when viewed in a plane normal to the engine centerline 12, however, it will be appreciated that the stiffener 134 can be formed as any suitable shape such as, but not limited to, circular, polygonal, or any combination thereof. For example, the stiffener 134 can define a rectangular prism with a rectangular cross section when viewed in a plane normal to the engine centerline 12.

The heat exchanger 100 can be formed through an electrodeposition manufacturing process, specifically through electroforming. It will be appreciated, however, that only the set of ducts 102, the set of rails 104, and the stiffeners 134 include a portion made through electroforming. In other words, the set of ducts 102, the set of rails 104, the carrier plate 106, and the stiffeners 134 can be defined as a set of electroformed ducts 102, a set of electroformed rails 104, and an electroformed stiffener 134, respectively, with each included an electroformed portion.

The heat exchanger 100, as illustrated, can include two ducts 102 and two corresponding rails 104. It will be appreciated, however, that the heat exchanger 100 can include any number of ducts 102 and rails 104. Further yet, the number of ducts 102 can be larger than, equal to, or less than the number of rails 104.

Figure 3:
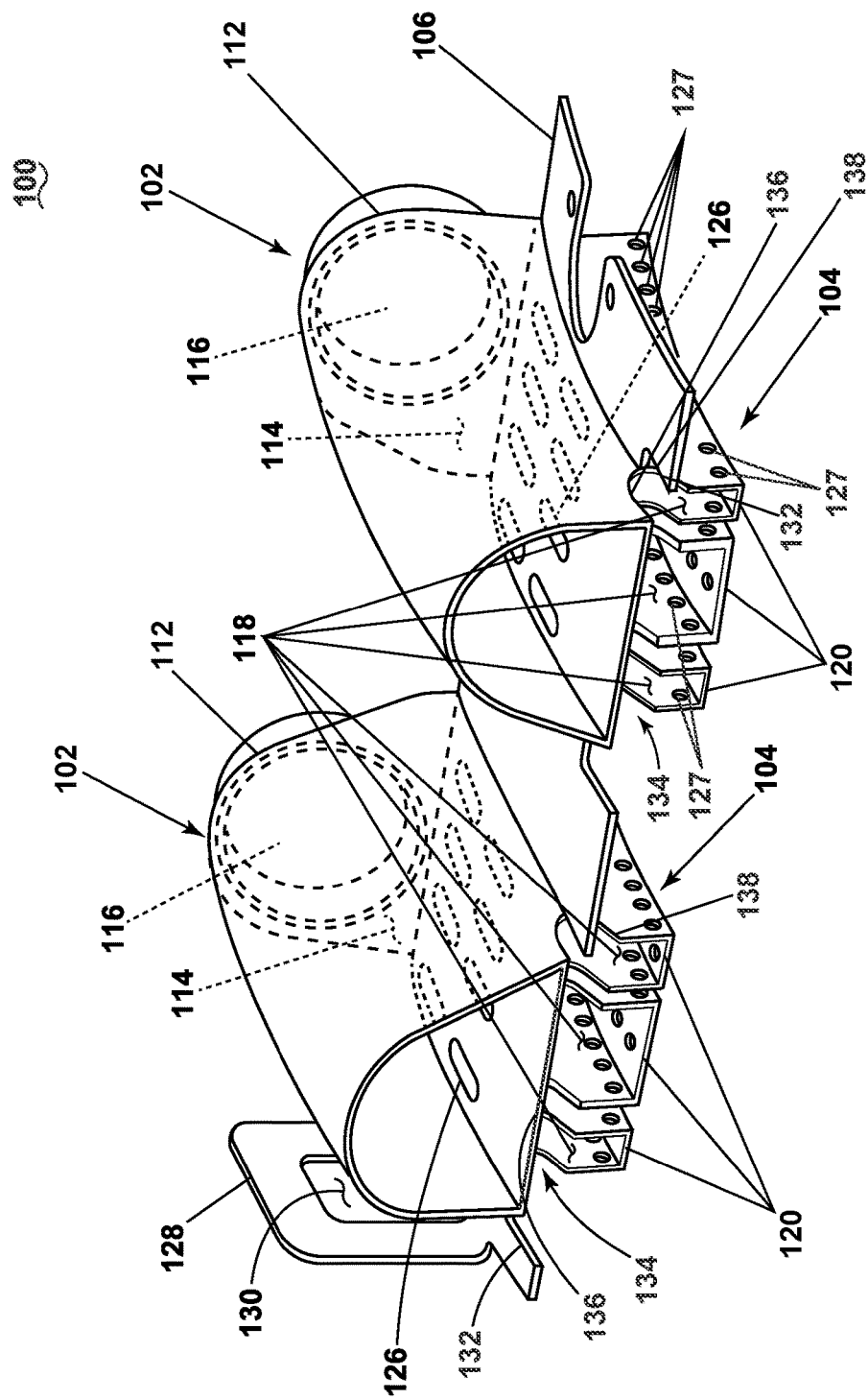
FIG. 3 is a perspective view of the heat exchanger taken along section III-III of FIG. 2, further illustrating a respective stiffener.

FIG. 3 is a perspective view of the heat exchanger 100 taken along section III-III of FIG. 2. As illustrated, the stiffener 134 can coincide with the edges of the stiffener opening 132 of the carrier plate 106 and extend through the entirety of the duct 102 and the rail 104.

As illustrated, the set of rails 104 can include an outer wall defining an interior channel 118. Each finger 120 can define a separate and discrete portion of the interior channel 118. The set of openings 126 can be provided along a portion of the carrier plate 106 corresponding to the interior fluid conduit 114 of the set of ducts 102 and the interior channel 118 defined by the set of rails 104. The set of openings 126 can fluidly couple the interior fluid conduits 114 to interior channels 118. The set of outlets 127 can be fluidly coupled to the interior channel 118 of the set of rails 104. The set of outlets 127 can be used to exhaust fluid from within the heat exchanger 100 to an exterior of the heat exchanger 100, specifically an exterior radially inward from the radially inner surface 110 of the carrier plate 106. As such, the outlets 127 can define a set of exhaust outlets of the set of rails 104 and the heat exchanger 100. As illustrated, the set of outlets 127 can be formed as circular through-holes within the set of rails 104 extending from a radially inner wall confronting the interior channel 118 and a radially outer wall confronting the exterior of the heat exchanger 100. It will be appreciated, however, that the outlets 127 can be formed as any suitable outlet and include any suitable geometric shape such as, but not limited to, ovular, rectangular, polygonal, or any combination thereof.

The stiffener 134 can further be defined by a first portion 136 and a second portion 138. The first portion 136 can be formed within a portion of the ducts 102, while the second portion 138 can be formed within a portion of the rails 104. As illustrated, the first portion 136 and the second portion 138 can extend into the interior fluid conduit 114 and the interior channel 118, respectively. As such, the portion of the ducts 102 defined by the first portion 136 and the portion of the rails 104 defined by the second portion 138, can further be defined by areas of a reduced cross section. The first portion 136 and the second portion 138 can meet at the stiffener opening 132. It will be appreciated that the first portion 136 and the second portion 138 can be defined by a unitary piece of metal such that the first portion 136 is integrally formed with the second portion 138, and the stiffener 134 physically couples the set of ducts 102 to the set of rails 104. The carrier plate 106 can be sandwiched between the set of ducts 102 and the set of rails 104, thus the set of ducts 102, the set of rails 104, and the carrier plate 106 can be coupled to one another through the stiffeners 134.

Figure 4:
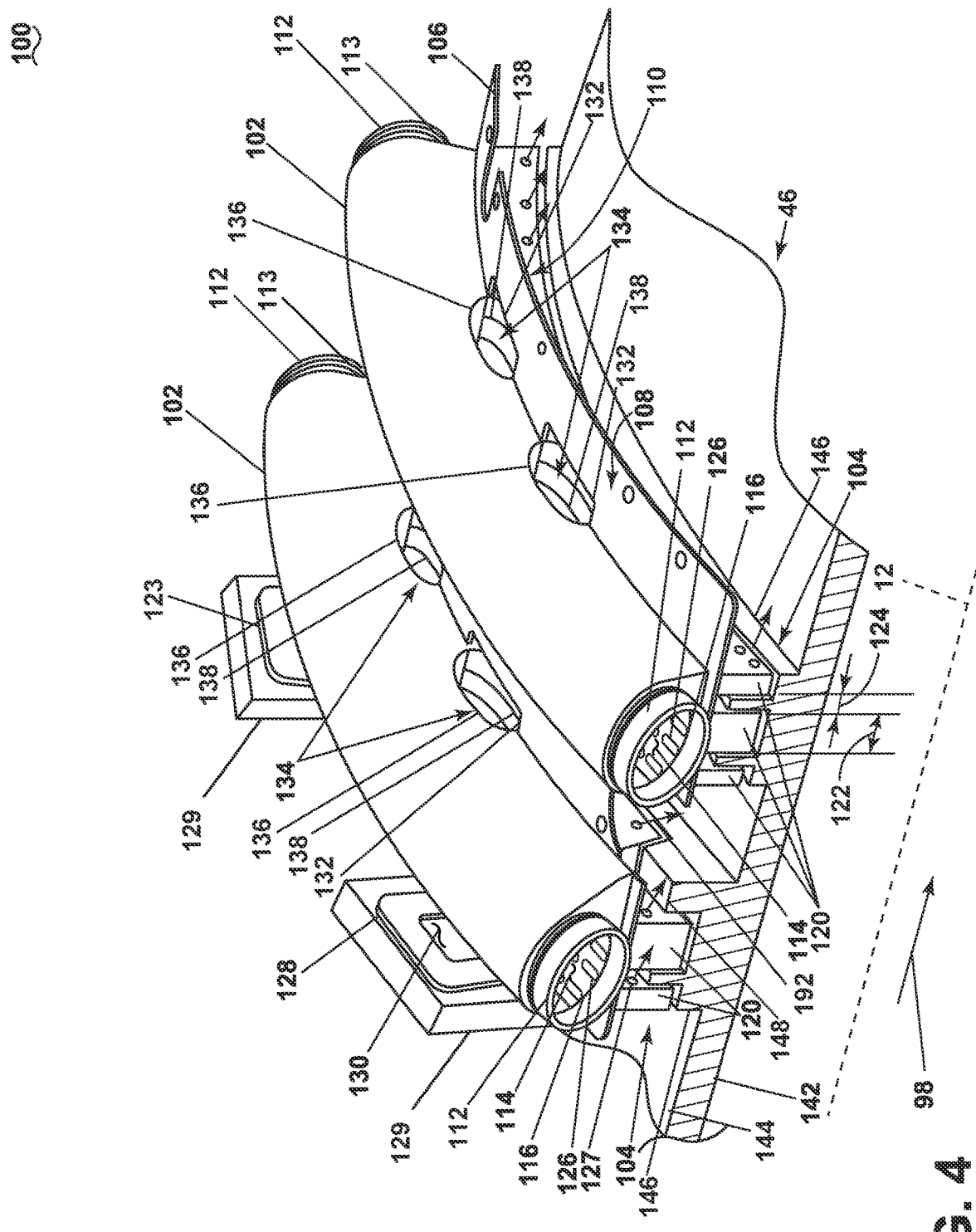
FIG. 4 is a perspective view of the heat exchanger shown in FIG. 2 provided along a portion of the casing of the gas turbine engine of FIG. 1.

FIG. 4 illustrates the heat exchanger 100 shown in FIG. 2 with the engine casing 46 of the gas turbine engine of FIG. 1. It will be appreciated that that the heat exchanger 100 can be provided along any portion of the engine casing 46 within the gas turbine engine 10. Although illustrated as the engine casing 46, it will be appreciated that the heat exchanger 100 can confront any suitable casing such as, but not limited to, the engine casing 46, or the fan casing 40. As such, the heat exchanger 100 can be provided within the fan section 18 of the gas turbine engine 10. The engine casing 46 can envelope at least a portion of the engine core 44 and be curved so as to define an outer circumference of the engine core 44. As illustrated, the heat exchanger 100 can follow the curvature of the engine casing 46 in the circumferential direction such that the heat exchanger 100 extends around at least a portion of the engine casing 46 and the engine core 44.

The engine casing 46 can be defined by a radially inner surface 142 and a radially outer surface 144, opposite and radially displaced from the radially inner surface 142. The heat exchanger 100 can confront at least a portion of the radially outer surface 144. In other words, at least a portion of the heat exchanger 100 can physically contact, confront, be coupled to, or otherwise face the radially outer surface 144 of the engine casing 46. Specifically, the set of rails 104 can confront the radially outer surface 144 of the engine casing 46.

The heat exchanger 100 can be mounted to a portion of the engine casing 46 through a coupling between the engine casing 46 and the brackets 128. As illustrated, a set of plates 129 can extend radially outwardly from the radially outer surface 144 of the engine casing 46 and confront at least a portion of the brackets 128. The brackets can then be mounted to the plates 129 through any suitable method such as, but not limited to, welding, adhesion, fastening, magnetism, or a combination thereof. Although illustrated as discrete plates 129, it will be appreciated that the bracket 128 can be mounted to any suitable portion of the engine casing 46. For example, the brackets 128 can be mounted to a front wall of the engine casing 46 that extends circumferentially about the entirety of the engine casing 46. In such a case, both brackets 128 can be mounted to the same part (e.g., the front wall) of the engine casing 46.

It will be appreciated that the engine casing 46, specifically the radially inner surface 142 of the engine casing 46, can confront a portion of a working airflow 98 or otherwise confront a set of rotating blades of the engine core 44 (e.g., the compressor blades 56, 58, the turbine blades 68, 70, or the fan blades 42) and the engine casing 46. As used herein, the working airflow 98 can refer to any suitable airflow within the gas turbine engine 10 such as, but not limited to, the pressurized airflow 76, the bleed air 77, the airflow 78, the combustion gases within the turbine section 32, or any other suitable airflow within the gas turbine engine 10. As illustrated, at least a portion of the heat exchanger 100 can extend in a direction transverse to the engine centerline 12 or the working airflow 98.

A set of projections 146 can extend radially outward from the radially outer surface 144 and otherwise define a portion of the radially outer surface 144. The set of projections 146 can corresponding to the gap 124 between the set of fingers 120 of the set of rails 104. The set of projections 146 can extend parallel to the set of rails 104 in the gap 124 between adjacent fingers 120 along the entire circumferential length of the fingers 120. Alternatively, the set of projections 146 can extend along only a portion of the circumferential length of the set of rails 104 such that a portion of the gap 124 between the adjacent fingers 120 is not filled with the set of projections 146 along the entire radial extent of the fingers 120. The set of projections 146 can further be defined as features of the engine casing 46. As such, a portion of the set of projections 146 can be defined by regions 148 of the set of projections that has increased width. This, in turn, can ensure that surface area (axial, radial, and circumferential) of the set of projections 146 confronting the set of fingers 120 is maximized. The set of rails 104 can be formed to have varying circumferential lengths so as to accommodate for these regions 148 of increased width, as illustrated. As such, the gap 124 and the maximum thickness 122 of the set of fingers 120 can be sized based on the spacing of the set of projections 146. As illustrated, a space can be formed between the projections 146 and the set of fingers 120 such that the projections 146 do not physically contact the fingers 120. It is contemplated, however, that one or more portions of the projections 146 can physical contact at least a portion of the fingers 120.

It is yet further contemplated that the set of projections 146 can extend radially across any portion in the gap between adjacent fingers 120. As illustrated, the set of projection's 146 do not extend radially past at least some of the outlets 127. Further yet, the stiffener 134 can be radially displaced from the engine casing 46 such that the stiffener 134 extends transverse to the working airflow 98.

During operation of the gas turbine engine 10, the working airflow 98 can flow through a portion of the gas turbine engine 10, specifically the engine core 44. The working airflow 98 can vary in temperature dependent on where it is in the engine core 44. For example, the working airflow can be upwards of 1500° C. downstream the combustion section 28 within the HP turbine 34. As the working airflow 98 flows through the engine core 44, the engine casing 46 can be heated by or otherwise absorb at least a portion of the heat from the working airflow 98. This heat, in turn, can transfer from the radially inner surface 142 confronting the engine core 44 or the working airflow 98 to the radially outer surface 144. The heat can then radiate radially outward from the radially outer surface 144 of the engine casing 46. The heat exchanger 100 can act as a heat shield between the heat radiating outward from the engine casing 46 and portions of the gas turbine engine 10 radially outward from the heat exchanger 100 such as, but not limited to, electronics, seals, or other suitable components that may be susceptible to the high heat of the working airflow 98.

Further yet, the heat exchanger 100 can cool at least a portion of the engine casing 46. For example, at least a portion of the heat exchanger 100, specifically the interior fluid conduit 114, can be directly fluidly coupled to a coolant source such that a coolant can flow through the interior fluid conduit 114, through the openings 116 of the carrier plate 106, and into the interior channel 118 of the set of rails 104. The coolant can be any suitable coolant such as, but not limited to, the bleed air 77, bypass air, a liquid coolant, or any other suitable coolant. At least a portion of the coolant within the rails 104 can be exhausted through the set of outlets 127 and impinge against at least a portion of the engine casing 46. The coolant exhausted from the outlets 127 can define a cooling fluid 192. As a non-limiting example, the cooling fluid 192 can impinge the radially outer surface 144 of the engine casing 46. The coolant within the rails 104, and thus the cooling fluid 192, can be of a lower temperature than the working airflow 98. As such, the cooling fluid 192 can be used to cool the engine casing 46. The remaining coolant within the heat exchanger 100 can then be transferred into the interior fluid conduit 114 and circulated out of the heat exchanger 100. As a non-limiting example, the coolant circulated out of the heat exchanger 100 can be merge with the fluid within the exhaust section 38. Alternatively, the heat exchanger 100 can be fluidly coupled to a coolant circuit such that the coolant within the heat exchanger 100 is circulated out of the heat exchanger 100, cooled (e.g., through another heat exchanger, or air-conditioning system) and then circulated back into the heat exchanger 100.

The heat exchanger 100 and the engine casing 46, together, can define an ACC system. As discussed above, during operation of the gas turbine engine 10, the coolant within the heat exchanger 100, specifically within the interior channel 118 of the rails 104, can be exhausted from the outlets 127 and impinge a portion of the engine casing 46. The cooling fluid 192 can be of a lower temperature than the working airflow 98 such that the cooling fluid 192 can cool the engine casing 46. As the engine casing 46 is heated by the working airflow 98, the engine casing 46 can expand radially outward with respect to the engine centerline 12. However, the cooling fluid 192 can counteract the expansion of the engine casing 46 by cooling the engine casing 46, thus eliminating the radial expansion of the engine casing 46. This, in turn, can maintain radial space between or clearance between the radially inner surface 142 of the engine casing 46 and a corresponding rotating blade. As a non-limiting example, the cooling fluid 192 can be used to contract the engine casing 46 such that the clearance between the radially inner surface 142 and the rotating blades is reduced. In either case, the ACC system can expand or contract depending on the operational state of the gas turbine engine such that the space or clearance between the tips and a radially inner portion of the ACC system (e.g., the radially inner surface 142 of the engine casing 46) can vary. The ACC system can dynamically control the clearance between the engine casing 46 and the rotating blades, which can ultimately reduce the amount of working airflow 98, defined as a leakage airflow, that is able to flow radially around the rotating blades. It is contemplated that the larger the amount of leakage airflow that is present within the gas turbine engine 10, the less effective the rotating blades are in generating work as the leakage airflow does not contact the rotating blades and generate torque. The ACC system can minimize the amount of leakage airflow or maximize the amount of working airflow 98, thus increasing the overall performance of the gas turbine engine 10.

During operation of the gas turbine engine 10 the pressurization of the fluid within the engine core 44 (e.g., the working airflow 98) can generate a force on the heat exchanger 100. As a non-limiting example, the pressurization can exert a hoop stress on the engine casing 46 and the heat exchanger 100 extending radially, circumferentially, and axially about the engine casing 46 and the heat exchanger 100. As discussed previously, the stiffener 134 can physically couple the set of ducts 102 to the set of rails 104. As such, the stiffener 134 can distribute the hoop stress evenly throughout the set of ducts 102, the set of rails 104, and the plate 156, thus reducing the effect that the hoop stress has on a single portion of the heat exchanger 100. In other words, the stiffener 134 can counteract the hoops stress. As used herein, the term "counteract" can be defined as the ability of a component (e.g., the heat exchanger 100) to withstand or otherwise be resilient to a force exerted on the component.

Figure 5:
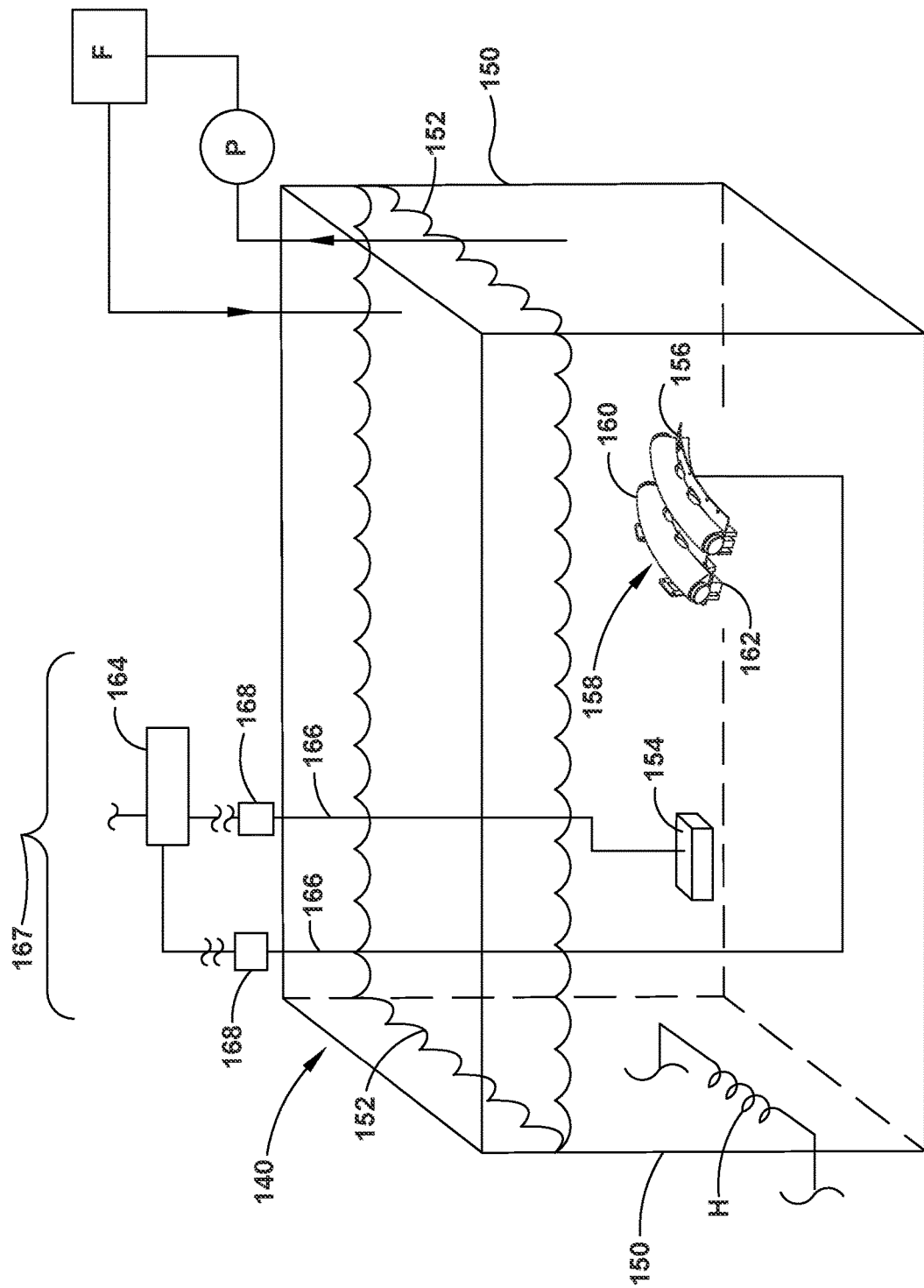
FIG. 5 is a schematic illustration of an electrodeposition bath with a mold in the form of the heat exchanger of FIG. 2, the mold including a first set of mandrels, a second set of mandrels and the carrier plate.

FIG. 5 is a schematic illustration of an electroforming process for forming the heat exchanger 100 of FIG. 2, by way of an electrodeposition bath 140 and a mold 158. An exemplary bath tank 150 carries a conductive electrolytic fluid solution 152. The electrolytic fluid solution 152, in one non-limiting example, can include aluminum alloy carrying alloying metal ions. In one alternative, non-limiting example, the electrolytic fluid solution 152 can include a nickel alloy carrying alloying metal ions.

An anode 154 spaced from the mold 158 provided in the bath tank 150. The mold 158 can include a set of cathodes. The set of cathodes can be defined by a first set of mandrels 160 in the shape of the set of ducts 102 (FIG. 2), a second set of mandrels 162 in the shape of the set of rails 104 (FIG. 2), and a plate 156 in the shape of the carrier plate 106 (FIG. 2) and having a conductive material. The anode 154 can be a sacrificial anode or an inert anode. While one anode 154 is shown, it should be understood that the bath tank 150 can include any number of anodes 154 as desired. As a non-limiting example, the first set of mandrels 160 and the second set of mandrels 162 can include a non-conductive material. As the material of the first set of mandrels 160 and the second set of mandrels 162 is non-conductive, the first set of mandrels 160 and the second set of mandrels 162 can be coated in an electrically conductive material such as, but not limited to, a carbon paint. Alternatively, the electrically conductive material can be any other suitable coating such as, but not limited to, copper, silver, or nickel. It is further contemplated that at the first set of mandrels 160 and the second set of mandrels 162 can be a reclaimable material that can be collected after the electroforming process and reused in future electroforming processes. The first set of mandrels 160 and the second set of mandrels 162 can include materials such as, but not limited to, waxes, plastics, polymer foams, metals, deformable materials, or any combination thereof. The first set of mandrels 160 and the second set of mandrels 162 can include materials that are collectible (e.g., can be removed) via melting, burning or leaching. As illustrated the first set of mandrels 160 and the second set of mandrels 162 both include two corresponding mandrels 160, 162. As such, the mold 158 can be used to form a heat exchanger 100 with two ducts 102, two rails 104, and the plate 156 disposed therebetween. It will be appreciated, however, that there can be any number of one or more mandrels 160 in the first set of mandrels 160 and any corresponding number of mandrels 162 in the second set of mandrels 162.

During the electroforming process, a metallic layer is deposited along any portion of the mold 158 defining the set of cathodes and exposed to the electrolytic fluid solution 152. As a non-limiting example, the exterior of the first set of mandrels 160, the exterior of the second set of mandrels 162, and the exterior of the plate 156 can be overlaid by a metallic layer thus forming the set of ducts 102, the set of rails 104, and the carrier plate 106 of the heat exchanger 100, respectively. After completion of the electroforming process, the first set of mandrels 160 and the second set of mandrels 162 can be reclaimed or otherwise removed from the electroformed component by any suitable method, such as, but no limited to, heating, melting, burning, leaching, or any other suitable method. As the first set of mandrels 160 and the second set of mandrels 162 are removed or otherwise sacrificed after the electroforming process, the first set of mandrels 160 can be defined as a first sacrificial element, while the second set of mandrels 162 can be defined as a second sacrificial element.

Conversely, no portion of the carrier plate 106 is sacrificial or otherwise removed by heating, melting, burning, or leaching. As such, the carrier plate 106 can be defined as a non-sacrificial element. The carrier plate 106 can include materials such as, but not limited to, a nickel-chromium based alloy, stainless steel alloys (e.g., stainless steel 305), or any other suitable material.

A controller 164, which can include a power supply, can be electrically coupled to the anode 154 and the mold 158, specifically the set of cathodes, by a set of electrical conduits 166 to form a circuit 167 via the electrolytic fluid solution 152. A switch 168 or sub-controller can be included along the electrical conduits 166, and can be positioned between the controller 164 and the anodes 154 and the mold 158, specifically the set of cathodes. During operation, a current can be supplied from the anode 154 to the mold 158, specifically the set of cathodes, via the electrolytic fluid solution 152 to electroform a metal layer along the exterior of the first set of mandrels 160 and the second set of mandrels 162 coated with the carbon paint. The metal layer can be any suitable metal such as, but not limited to, aluminum, iron, cobalt, nickel, or any combinations thereof.

A pump (P) and filter (F) can be utilized to filter and chemically maintain the electrolytic fluid solution 152 at a particular ion concentration, or to remove any foreign matter. The filter (F) can include, by way of non-limiting example, a chemical filtering media. A heater (H) is provided to regulate a temperature of the electrodeposition bath 140. In non-limiting examples, the heater (H) can be disposed within the bath tank 150 or proximate the bath tank 150 exterior to the bath tank 150. Alternatively, the heater (H) can be in fluid communication with the pump (P) to heat the electrolytic fluid solution 152 as it is pumped by the pump (P).

Figure 6:
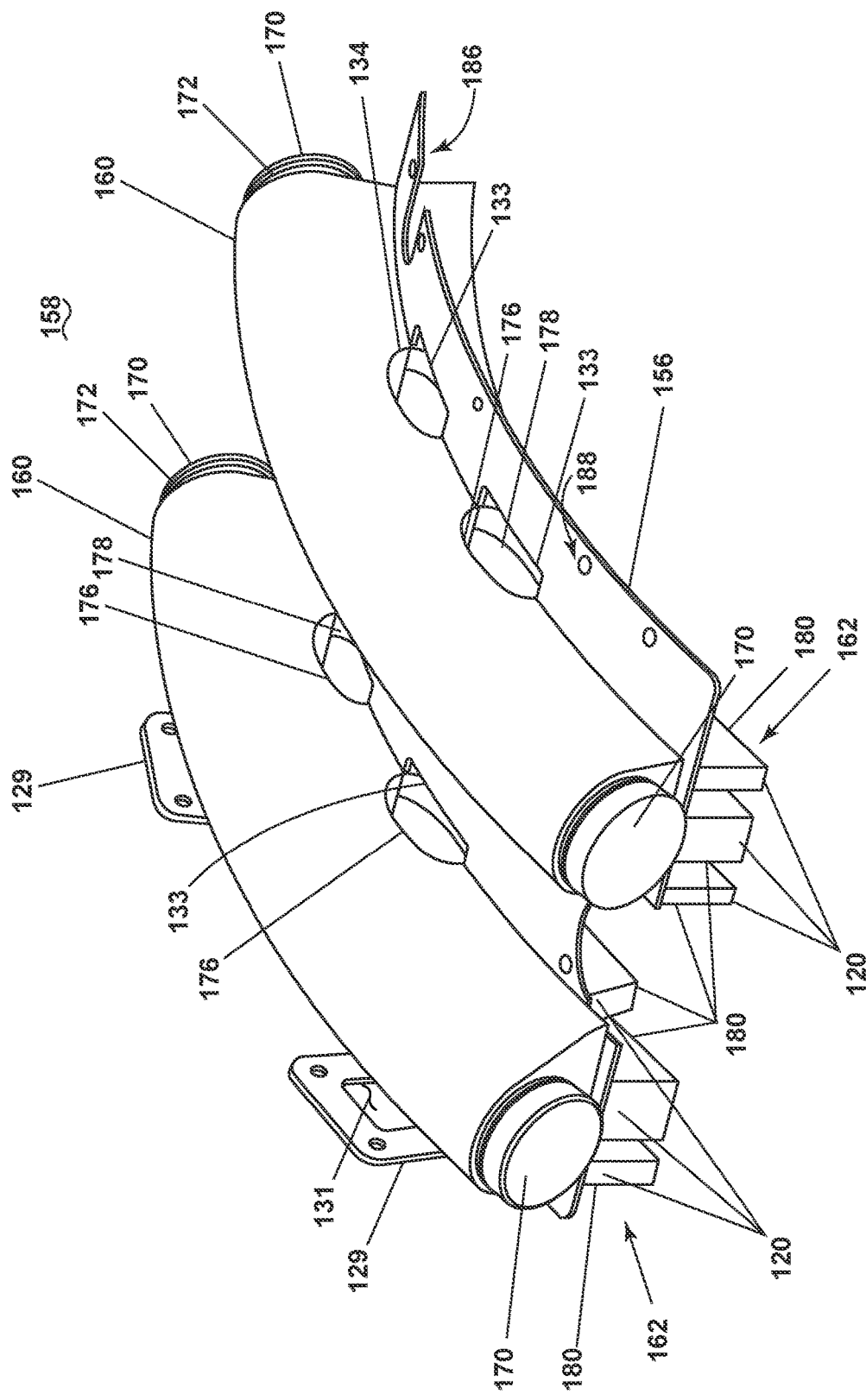
FIG. 6 is a perspective view of the mold of FIG. 4.

FIG. 6 is a perspective view of the mold 158 of FIG. 4 including the first set of mandrels 160, and the second set of mandrels 162, with the plate 156 disposed therebetween. As discussed previously, the mold 158 can include the first set of mandrels 160 defining the set of ducts 102, the second set of mandrels 162 defining the set of rails 104, and the plate 156 disposed therebetween and defining the carrier plate 106. As a non-limiting example, the first set of mandrels 160 can define the interior fluid conduit 114 of the set of ducts 102 and the metallic layer disposed on the exterior of the first set of mandrels 160 can define the exterior body of the set of ducts 102. The second set of mandrels 162 can define the interior channel 118 of the set of rails 104 and the metallic layer disposed on the exterior of the second set of mandrels 162 can define the exterior body of the set of rails 104. The plate 156 and the metallic layer disposed on the exterior of the plate 156 can together define the carrier plate 106.

The plate 156 can extend between a radial inner surface 186 and a radial outer surface 188, opposite and displaced from the radial inner surface 188. An opening 190 can extend through a portion of the plate 156. For example, the opening 190 can extend between the radial inner surface 186 and the radial outer surface 188. A projection 193 can extend outward from and normal to the radial outer surface 188. The projection 193 can be formed with a cut out 194 or an absence of material.

The first set of mandrels 160 can extend between a set of first distal ends 170. A set of features 172 can be provided near the set of first distal ends 170 and extend outward from the first set of mandrels 160. The second set of mandrels 162 can coincide with the first set of mandrels 160 such that the second set of mandrels 162 extend between a set of second distal ends 174, with at least one of the second distal ends 174 corresponding to at least one of the first distal ends 170 of the first mandrel 160.

The first set of mandrels 160 can include a first stiffener feature 176, while the second set of mandrels 162 can include a second stiffener feature 178 coinciding to the first stiffener feature 176. The first stiffener feature 176 and the second stiffener feature 178 can overlay the opening 190 of the plate 156.

The second set of mandrels 162 can further include a set of finger portions 180 that extend outward from the inner surface 186 of the plate 156 As illustrated, there can be three finger portions 180 per second mandrel 162, however, it will be appreciated that there can be any number of one or more finger portions 180 per second mandrel 162.

During the electroforming process, everything along the first set of mandrels 160 and the second set of mandrels 162 can be covered with the carbon paint such that a metal layer is deposited along the entirety of the first set of mandrels 160 and the second set of mandrels 162. Once the first set of mandrels 160 and the second set of mandrels 162 are removed, only the metal layer will remain. As discussed herein, the plate 156 can be defined as a cathode. As a non-limiting example, the plate 156 can be defined as a non-sacrificial mandrel having a conductive material. As such, the features described herein of the first set of mandrels 160, the second set of mandrels 162, and the plate 156, can coincide with portions of the heat exchanger 100 (FIG. 2). As a non-limiting example, the set of first distal ends 170, the set of features 172, and the first stiffener feature 176 can correspond to the distal end 112, the feature 113, and the first portion 136, respectively, of the set of ducts 102, while the remaining body of the second set of mandrels 162 can define at least a portion of the interior fluid conduit 114. The set of finger portions 180, and the second stiffener features 178 can correspond to the set of fingers 120, and the second portion 138, respectively, while a body of the set of second mandrels 162 can define the interior channel 118. The radial inner surface 188, the radial outer surface 188, the opening 190, the projection 193 and the cut out 194 can correspond to the radially inner surface 108, the radially outer surface 110, the stiffener opening 132, the bracket 128, and the cut out 130 of the carrier plate 106, respectively.

After the electroforming process, and the sacrificial elements are removed, additional tooling can be done to form various portions of the heat exchanger 100. For example, additional tooling can be done to form the outlets 127, or the openings 116. The tooling can be done through any suitable tooling process such as, but not limited to, drilling, chiseling, cutting, or any combination thereof. Alternatively, it is contemplated that one or more portions of the first set of mandrels 160 or the second set of mandrels 162 is not covered by the carbon paint such that additional tooling is not required. As such, after the electroforming process, the metal layer can be discontinuous over the first set of mandrels 160 and the second set of mandrels 162, thus defining an area of the mandrels 160, 162 without a metal layer. As a non-limiting example, at least a portion of the first set of distal ends 170 or at least a portion of the second set of distal ends 174 can be void of carbon paint such that an opening (e.g., the set of openings 116) is formed into the interior fluid conduit 114 and the interior channel 118, respectively.

Figure 7:
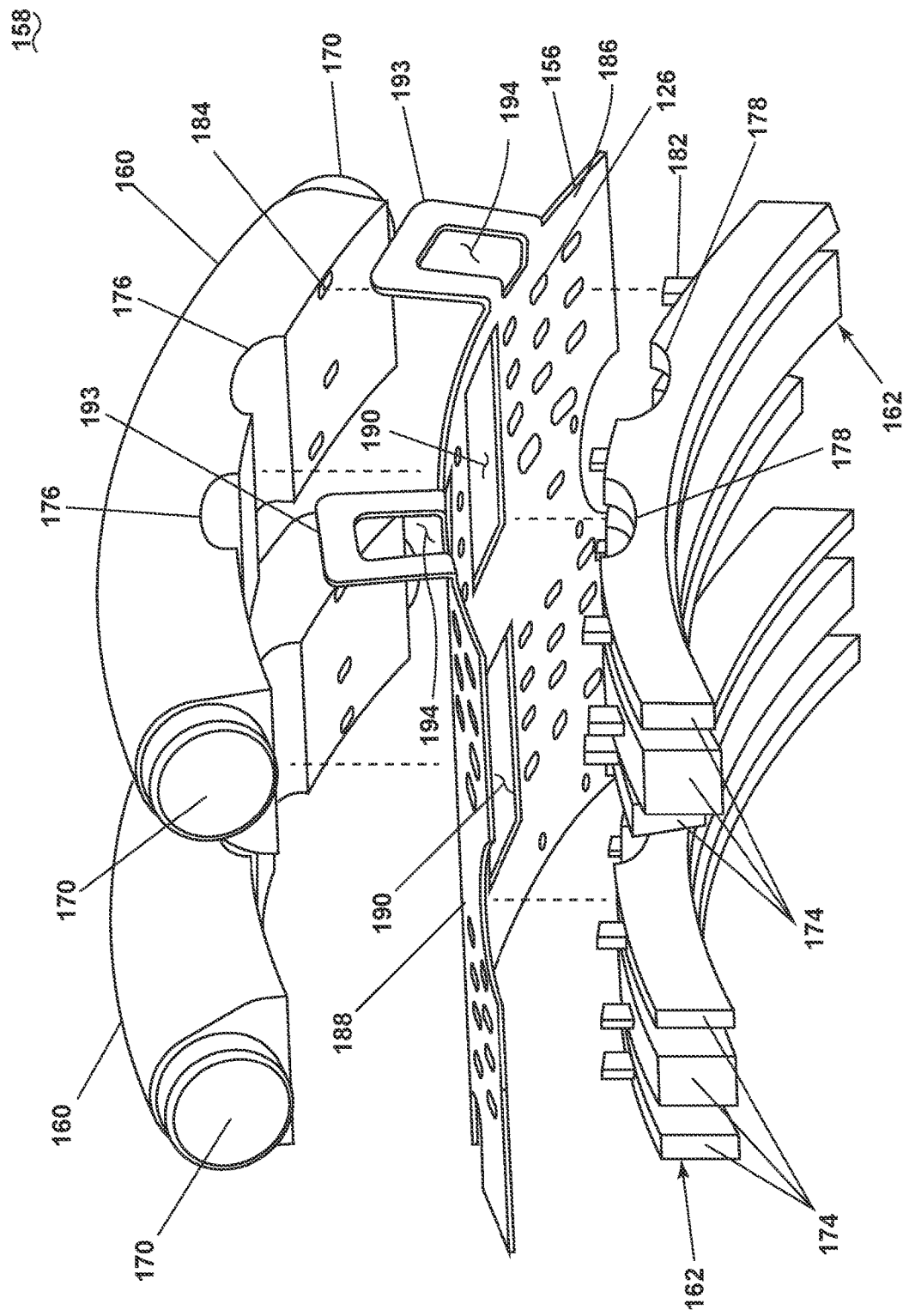
FIG. 7 is an exploded perspective view of the mold of FIG. 5 further illustrating a set of tabs and a set of receivers.

FIG. 7 is an exploded view of the mold 158 of FIG. 4 including the first set of mandrels 160, and the second set of mandrels 162, with the plate 156 disposed therebetween.

It will be appreciated that during the electroforming process, a portion of the plate 156 is covered by the first set of mandrels 160 and the second set of mandrels 162. As such, a portion of the plate 156 will not be exposed to the electrolytic fluid solution 152, meaning that a metallic layer will not be disposed on the portions of the plate 156 not exposed to the electrolytic fluid solution 152. As a non-limiting example, the plate 156 can include the set of openings 126 of the carrier plate 106. The set of openings 126 can be covered by the first set of mandrels 160 and the second set of mandrels 162 such that a metallic layer is not formed over or around the set of openings 126.

A set of tabs 182 located the set of second mandrels 162 can extend outward from the second set of mandrels 162 and correspond to at least some of the set of openings 126 of the plate 156. In other words, the set of tabs 182 can coincide with and be shaped such that the set of tabs 182 can extend through at least some of the openings 126 of the carrier plate 106.

A set of receivers 184 located on the first set of mandrels 160 can extend into a portion of the first set of mandrels. The set of receivers 184 can correspond to the set of tabs 182 such that for every tab 182, there is a corresponding receiver 184. The receivers 184 can be sized such that the tabs 182 can fit within the receivers 184. The tabs 182 and the receivers 184 can physically couple the first set of mandrels 160 to the second set of mandrels 162, with the carrier plate 106 can be disposed therebetween.

Figure 8:
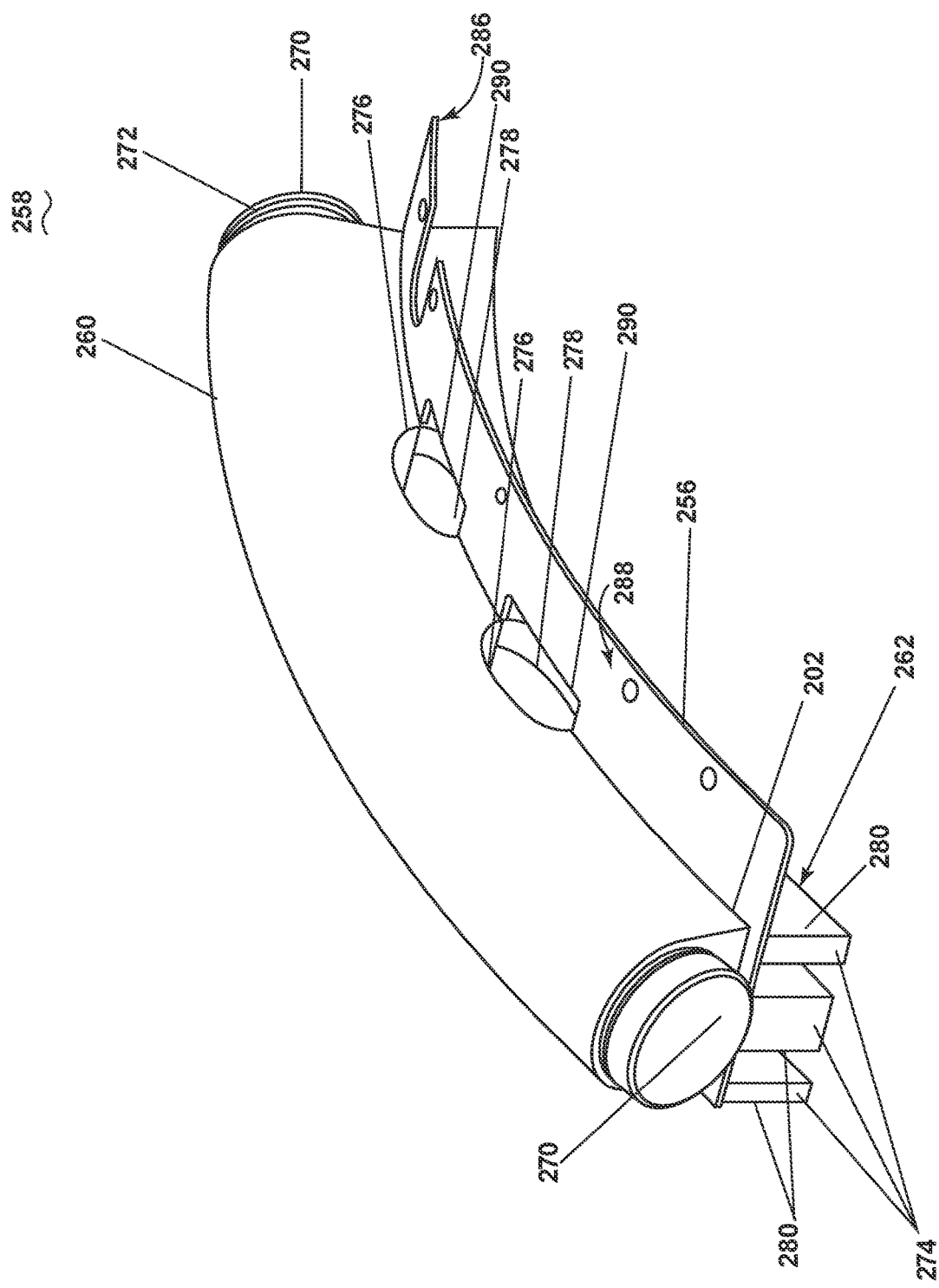
FIG. 8 is a perspective view of an exemplary mold of FIG. 4 used in forming an exemplary heat exchanger.

FIG. 8 is a perspective view of an exemplary mold 258 used to form an exemplary heat exchanger similar to the heat exchanger 100 (FIG. 2). The mold 258 is similar to the mold 158; therefore, like parts will be identified with like numerals in the 200 series, with it being understood that the description of the like parts of the mold 158 applies to the exemplary mold 258 unless otherwise noted.

The mold 258 includes a first mandrel 260 and a second mandrel 262 with a plate 256 disposed therebetween. The plate 256 can extend from a radially inner surface 286 to a radially outer surface 288.

The first mandrel 260 and the second mandrel 262 can be similar to the first set of mandrels 160 and the second set of mandrels 162, except the first mandrel 260 and the second mandrel 262 only include a singular first mandrel 260 and a singular second mandrel 262 corresponding with the first mandrel 260. As such, the mold 258 can form an exemplary heat exchanger with a singular duct 102 and a singular rail 104. A set of features 272 can be provided along at least one distal end of a set of first distal ends 270 and extend outward from the first mandrel 260. The first mandrel 260 can further include a first stiffener feature 276.

The second mandrel 262 can extend between a set of second distal ends 274, with at least one of the second distal ends 274 circumferentially corresponding to at least one the first distal ends 270 of the first mandrel 260. The second mandrel 262 can further include a second stiffener feature 278 and a set of finger portions 280.

The plate 256 can be similar to the plate 156 except that the plate 156 can have a different length in comparison to the plate 156. As a non-limiting example, the plate 256 can be defined as a shortened plate 256 in comparison to the plate 156. The plate 256 does not include the projection 193 like the plate 156, thus the carrier plate 106 formed by the mold 258 does not include the bracket 128. The mold 258 can be used in instances where only a portion of the heat exchanger 100 is needed.

FIG. 9 is a method 300 of electroforming the heat exchanger 100 of FIG. 2 through use of the mold 158 of FIG. 5. Although described in terms of the heat exchanger 100 and the mold 158, it will be appreciated that the method 300 can be applied to any suitable heat exchanger, such as the exemplary heat exchanger formed with the mold 258 of FIG. 7.

The method 300 can begin by electroforming at least one duct 102 over at least one first mandrel 160 carried by the plate 156, at 302. As discussed previously, the first mandrel 160 can be a sacrificial mandrel or otherwise a first sacrificial element, while the plate 156 can be a non-sacrificial element. The non-sacrificial element, or the plate 156, can include the opening 190 corresponding to the stiffener opening 132, and the set of openings 126, or cooling openings, extending between the radial inner surface 186 and the radial outer surface 188. The sacrificial first element, or the first mandrel 260, can include the first stiffener feature 176 corresponding to the first portion 136 of the stiffener 134, overlying the opening 190 corresponding to the stiffener opening 132 on the radial outer surface 188. The body of the first mandrel 160, which at least partially defines the interior fluid conduit 114, can abut the set of openings 126 on the radial outer surface 188 of the non-sacrificial element. At least one rail 104, corresponding to the at least one duct 102, can be electroformed over at least one second mandrel 162 carried by plate 156, at 304. As discussed previously, the second mandrel 162 can be a sacrificial mandrel or a second sacrificial element. The second sacrificial element can include a second stiffener feature 278 corresponding to the second portion 138 of the stiffener 134. The second stiffener feature 278, and thus the second portion 138, can overlay the opening 190 on the radial inner surface 186 of the non-sacrificial element. The body of the second mandrel 162, which at least partially defines the interior channel 118, can abut the set of openings 126 on the radial inner surface 186 of the non-sacrificial element. The first sacrificial element and the second sacrificial element can be removed to define the interior fluid conduit 114 within the duct 102, and the interior channel 118 with in the rail 104, respectively, at 306. The interior fluid conduit 114 can be fluidly coupled to the interior channel 118 through the set of openings 126. The stiffener 134 can be formed by the physical coupling between the first portion 136 and the second portion 138.

The sequence depicted is for illustrative purposes only and is not meant to limit the method 300 in any way as it is understood that the portions of the method can proceed in a different logical order, additional or intervening portions can be included, or described portions of the method can be divided into multiple portions, or described portions of the method can be omitted without detracting from the described method. For example, the method 300 can include various other steps.

In one non-limiting example, the method 300 can further include electroforming the carrier plate 106 over the plate 156. As discussed herein, the plate 156 can be defined as a non-sacrificial element as it is not removed after the electroforming process. As such, the plate 156 and the metal layer deposited over the plate 156 together form the carrier plate 106. The plate 156, or non-sacrificial element, can include the set of openings 190 corresponding to the stiffener opening 132, along with the set of openings 126.

In another non-limiting example, the method 300 can further include at least one of burning, melting, heating, leaching, or any other combinations thereof, the first sacrificial element and the second sacrificial element during the process of removing the first sacrificial element and the second sacrificial element, at 306.

In yet another non-limiting example, the method 300 can further include aligning the second sacrificial element with the plate 156 such that at least one of the set of tabs 182 extend through the openings 126 of the plate 156 from the radial inner surface 186 to the radial outer surface 188. The method 300 can yet further include aligning the at least one of the tabs 182, which extend through at least one of the openings 126, with at least one of the set of receivers 184 such that at least one tab 182 extends into at least one corresponding receiver 184, thus coupling the first sacrificial element to the second sacrificial element, with the plate 156 disposed therebetween.

In yet another non-limiting example, the method 300 can further include coating at least a portion of the first sacrificial element and the second sacrificial element with a conductive coating (e.g., the carbon pain) such that the first sacrificial element and the second sacrificial element define the set of cathodes or a cathode layer. The coating can be done through any suitable method such as, but not limited to, painting, spraying, dunking, or any combination thereof. The method 300 can yet further include removing the cathode layer with an etchant, which can be any suitable etchant such as, but not limited to, acetone.

In yet another non-limiting example, the method 300 can further include tooling at least a portion of the heat exchanger 100 after electroforming has occurred. For example, the method 300 can include tooling, by drilling or cutting, the outlets 127 within the set of rails 104. As yet another non-limiting example, the method 300 can include tooling, by drilling or cutting, the set of openings 116 of the set of ducts 102.

Benefits of the present disclosure include a method of forming a heat exchanger without the need for conventional coupling methods that are needed in conventional heat exchangers. As a non-limiting example, a benefit of the present disclosure includes a method for forming a heat exchanger for an ACC system without the need for conventional coupling methods that are needed when forming a conventional heat exchanger for a conventional ACC system. For example, conventional heat exchangers such as those found in conventional ACC systems include a set of rails, a set of ducts, and a plate disposed therebetween. The rails, the ducts, and the plate are all prefabricated components that need to be physically coupled to one another through various methods such as welding, adhesion, fastening, or the like. These points where the prefabricated components are physically coupled to one another can establish points along the conventional heat exchanger that may be more susceptible to failure from use of the heat exchanger. For example, during operation of the gas turbine engine, the conventional heat exchanger can have forces (e.g., the hoop stress) or be exposed indirectly to high heats (e.g., the heat radiating from the engine casing), which can ultimately cause the points of coupling to fail. This, in turn, can negatively affect the life expectancy of the conventional heat exchangers. The heat exchangers that can be used in the ACC system, as described herein, however, do not use the conventional coupling methods. Instead, the heat exchanger, as described herein, is additively manufactured through electrodeposition, specifically electroforming. This process of additive manufacturing eliminates the areas of physical coupling that would otherwise act as potential points of failure that are present in the conventional heat exchangers. As such, the heat exchanger, as described herein, can have a longer life-expectancy and be more resilient to the forces and heat within the turbine engine than the conventional heat exchanger.

Further benefits of the present disclosure include a heat exchanger that can better withstand the forces exerted on the heat exchanger during operation of the turbine engine when compared to conventional heat exchangers. As a non-limiting example, a benefit of the present disclosure includes a heat exchanger for an ACC system that can better withstand the forces exerted on the heat exchanger when compared to conventional heat exchangers for conventional ACC systems. For example, conventional heat exchangers, include a set of ducts and a set of rails that are continuous and homogenous about its entire circumferential extent. This, in turn, makes the conventional heat exchanger susceptible to various stresses that will be exerted on the heat exchanger during operation of the turbine engine, such as the hoop stress exerted on the heat exchanger from the pressure of the working airflow. The heat exchanger that can be used in the ACC system, however, includes the set of stiffeners provided along the set of ducts and the set of rails, which extend through the stiffener opening of the carrier plate and physically couple the set of rails to the set of ducts. The set of stiffeners act to reduce the hoop stress within the set of rails, the carrier plate, and the set of ducts by distributing the hoop force along the heat exchanger. This, in turn, reduces the susceptibility of the heat exchanger with regards to the forces exerted on the heat exchanger during the operation of the turbine engine when compared to conventional heat exchangers. This, ultimately, increases the efficiency and lifetime of the heat exchanger.

Yet another benefit of the present disclosure includes a heat exchanger that is lighter and minimizes waste when compared to a conventional heat exchanger. As a non-limiting example, another benefit of the present disclosure includes a heat exchanger for an ACC system that is lighter and minimized waste when compared to conventional heat exchangers for conventional ACC systems. For example, as discussed above, conventional heat exchangers rely on prefabricated parts when constructing the conventional heat exchanger. In heat exchangers with two or more ducts and rails, the ducts and rails can be formed as a single prefabricated part such that material spans across the distance between adjacent ducts or rails. Alternatively, the two or more rails or two or more ducts can be formed as separate pieces that each need to be physically coupled to the plate in some way, shape, or form. Additionally, the ducts and rails of conventional heat exchangers need to be physically coupled to the carrier plate. All of this adds additional material to the assembly, which, in turn, increases the overall weight of the conventional heat exchanger. The heat exchanger as described herein, however, is formed through additive manufacturing and includes the set of stiffeners coupling the set of rails the set of ducts as described previously Further yet, a monolithic metal layer is deposited over the entirety of the first set of mandrels, the second set of mandrels and the plate. This, in turn, means that every component of the heat exchanger is formed as a unitary metallic piece and thereby coupled to each other. In other words, there is no need to connect adjacent ducts or adjacent rails to one another, or to the carrier plate. This ultimately reduces the total material needed to form the heat exchanger when compared to conventional heat exchangers. Further yet, the bracket of the carrier plate includes a cut out, whereas conventional brackets do not. This yet further eliminates additional material needed to create the heat exchanger. Ultimately, the heat exchanger as described herein is lighter than conventional heat exchangers. This, in turn, reduces the overall weight of the turbine engine, thus increasing the efficiency of the turbine engine when compared to conventional turbine engines.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new examples, whether or not the new examples are expressly described. Combinations or permutations of features described herein are covered by this disclosure. Many other possible embodiments and configurations in addition to that shown in the above figures are contemplated by the present disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

An electroformed heat exchanger suitable for use within a turbine engine having an engine centerline, the electroformed heat exchanger comprising, an electroformed carrier plate having a radial outer surface and a radial inner surface, with a stiffener opening extending between the radial inner and outer surfaces, and a plurality of cooling openings extending between the radial inner and outer surfaces, an electroformed duct having an interior fluid conduit fluidly coupled to the plurality of cooling openings, an electroformed rail having at least one interior channel fluidly coupled to the plurality of cooling openings, wherein the interior channel is fluidly coupled to the interior fluid conduit by the plurality of cooling openings, and an electroformed stiffener formed by a portion of the electroformed duct and the electroformed rail and overlying the stiffener opening.

The electroformed heat exchanger of any of the preceding clauses, wherein the electroformed stiffener operably couples the electroformed duct to the electroformed rail.

The electroformed heat exchanger of any of the preceding clauses, wherein the electroformed stiffener defines an axially extending void, with respect to the engine centerline, coupled to the stiffener opening.

The electroformed heat exchanger of any of the preceding clauses, wherein the interior fluid conduit and interior channel extend circumferentially about the engine centerline.

The electroformed heat exchanger of any of the preceding clauses, wherein the stiffener extends generally transverse to a direction of fluid flow within at least one of the interior fluid conduit or the interior channel.

The electroformed heat exchanger of any of the preceding clauses, wherein the electroformed heat exchanger comprises a plurality of circumferentially arranged segments.

The electroformed heat exchanger of any of the preceding clauses, wherein the electroformed stiffener defines an ovular cross-section when viewed in a plane normal to engine centerline.

The electroformed heat exchanger of any of the preceding clauses, wherein the electroformed heat exchanger is provided along a portion of a stationary casing of the turbine engine, and wherein the stationary casing further comprises a radially inner surface confronting a working airflow of the turbine engine and a radially outer surface, opposite the radially inner surface, wherein the electroformed heat exchanger is provided along a portion of the radially outer surface.

The electroformed heat exchanger of any of the preceding clauses, wherein the stationary casing includes a set of projections extending radially outwardly from the radially outer surface, with respect to the engine centerline, and the electroformed rail fits over the set of projections.

The electroformed heat exchanger of any of the preceding clauses, wherein the electroformed rail includes a set of fingers a set of fingers extending radially away from the electroformed carrier plate, the set of fingers being axially displaced with respect to one another, with a gap defining a space between adjacent fingers, and wherein the set of projections fit within the gap.

The electroformed heat exchanger of any of the preceding clauses, wherein the electroformed duct is included within a set of axially spaced electroformed ducts, and the electroformed rail is included within a set of axially spaced electroformed rails corresponding to the set of axially spaced electroformed ducts.

The electroformed heat exchanger of any of the preceding clauses, wherein the electroformed carrier plate further includes a bracket extending radially outward with respect to the engine centerline, and wherein the bracket is coupled to at least a portion of the turbine engine.

The electroformed heat exchanger of any of the preceding clauses, wherein the electroformed heat exchanger is provided within a high-pressure turbine section of the turbine engine.

A method of electroforming a heat exchanger suitable for use within a turbine engine having an engine centerline, the method comprising electroforming a duct over a first sacrificial element carried by a non-sacrificial carrier plate, the non-sacrificial carrier plate having a radial outer surface and a radial inner surface, with a stiffener opening extending between the radial inner and outer surfaces, and a plurality of cooling openings extending between the radial inner and outer surfaces, and the first sacrificial element having a stiffener portion overlying the stiffener opening on the radial outer surface and a conduit portion abutting the plurality of cooling openings on the radial outer surface, electroforming a rail over a second sacrificial element having a stiffener portion overlying the stiffener opening on the radial inner surface and a conduit portion abutting the plurality of cooling openings on the radial inner surface, and removing the first and second sacrificial elements to form a conduit within the duct and a channel within the rail, with the conduit and duct connected by the plurality of cooling openings, and further forming a stiffener formed by a portion of the duct and rail and overlying the stiffener opening.

The method of any of the preceding clauses, further comprising electroforming the non-sacrificial carrier plate over a non-sacrificial element, the non-sacrificial element having an opening corresponding to the stiffener opening.

The method of any of the preceding clauses, wherein the removing of the first sacrificial element and the second sacrificial element comprises at least one of melting, burning, heating, or leaching the first sacrificial element and the second sacrificial element.

The method of any of the preceding clauses, wherein the first sacrificial element includes at least one receiver and the second sacrificial element includes at least one tab corresponding to the at least one receiver.

The method of any of the preceding clauses, further comprising aligning the at least one tab with at least one cooling opening of the plurality of cooling openings such that the at least one tab extends through the at least one cooling opening.

The method of any of the preceding clauses, further comprising aligning the at least one receiver with the at least one tab.

The method of any of the preceding clauses, further comprising coating, with a carbon paint, at least a portion of the first sacrificial element and the second sacrificial element to define a cathode layer.

What is claimed is:

1. A method of electroforming a heat exchanger suitable for use within a turbine engine having an engine centerline, the method comprising:
    electroforming a duct over a first sacrificial element carried by a non-sacrificial carrier plate, the non-sacrificial carrier plate having a radial outer surface and a radial inner surface, with a stiffener opening extending between the radial inner surface and the radial outer surface, and a plurality of cooling openings extending between the radial inner surface and the radial outer surface, and the first sacrificial element having a stiffener portion overlying the stiffener opening on the radial outer surface and a conduit portion abutting the plurality of cooling openings on the radial outer surface;
    electroforming a rail over a second sacrificial element having a stiffener portion overlying the stiffener opening on the radial inner surface and a conduit portion abutting the plurality of cooling openings on the radial inner surface; and
    removing the first sacrificial element and the second sacrificial element to form a conduit within the duct and a channel within the rail, respectively, with the conduit and the duct connected by the plurality of cooling openings, with a stiffener being formed by a portion of the duct and the rail and overlying the stiffener opening.

2. The method of claim 1, further comprising electroforming the non-sacrificial carrier plate over a non-sacrificial body having an opening corresponding to the stiffener opening.

3. The method of claim 1, further comprising removing of the first sacrificial element and the second sacrificial element by at least one of melting, burning, heating, or leaching the first sacrificial element and the second sacrificial element.

4. The method of claim 1, wherein the first sacrificial element includes at least one receiver and the second sacrificial element includes at least one tab corresponding to the at least one receiver.

5. The method of claim 4, further comprising aligning the at least one tab with at least one cooling opening of the plurality of cooling openings such that the at least one tab extends through the at least one cooling opening.

6. The method of claim 4, further comprising aligning the at least one receiver with the at least one tab.

7. The method of claim 1, further comprising coating at least a portion of the first sacrificial element and at least a portion of the second sacrificial element to define a cathode layer.

8. The method of claim 7, further comprising coating, with a carbon paint, at least the portion of the first sacrificial element and at least the portion of the second sacrificial element to define the cathode layer.

9. The method of claim 1, wherein at least a portion of the first sacrificial element extends transverse the stiffener opening.

10. The method of claim 9, further comprising removing the first sacrificial element to define the conduit extending transverse the stiffener opening.

11. The method of claim 1, wherein at least a portion of the second sacrificial element extends transverse the stiffener opening.

12. The method of claim 11, further comprising removing the second sacrificial element to define the channel extending transverse the stiffener opening.

13. The method of claim 1, wherein the non-sacrificial carrier plate includes a bracket extending radially outward, with respect to the engine centerline.

14. The method of claim 13, further comprising coupling the heat exchanger, via the bracket, to a respective portion of the turbine engine.

15. The method of claim 13, wherein the turbine engine comprises a stationary casing, the stationary casing includes a radially inner surface confronting a working airflow of the turbine engine, and a radially outer surface, opposite the radially inner surface.

16. The method of claim 15, further comprising aligning the rail over a respective portion of the radially outer surface.

17. The method of claim 16, wherein the stationary casing includes a set of projections extending radially outwardly from the radially outer surface, with respect to the engine centerline, and the method further comprising:
    aligning with the stationary casing such that the rail fits over a respective portion of the set of projections.

18. The method of claim 17, further comprising:
    forming the rail with at least two adjacent fingers to define a gap therebetween; and
    aligning the at least two adjacent fingers with at least one projection of the set of projections such that the at least one projection is at least partially provided within the the gap.

19. The method of claim 1, wherein the second sacrificial element includes a plurality of spaced fingers, and the method further comprises electroforming a plurality of rails over the plurality of spaced fingers.

20. The method of claim 1, wherein the first sacrificial element is provided within a plurality of first sacrificial elements and the second sacrificial element is provided within a plurality of second sacrificial elements.

* * * * *